J. V. SANFORD.
ADJUSTABLE BEARING.
APPLICATION FILED MAY 29, 1920.
1,356,561.
Patented Oct. 26, 1920.
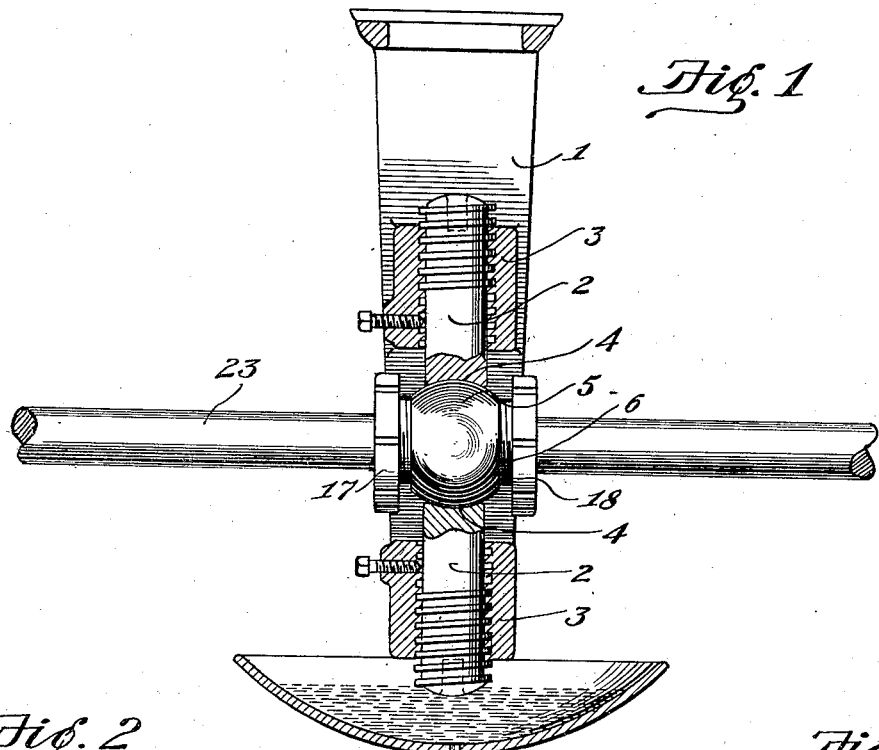
Fig. 1
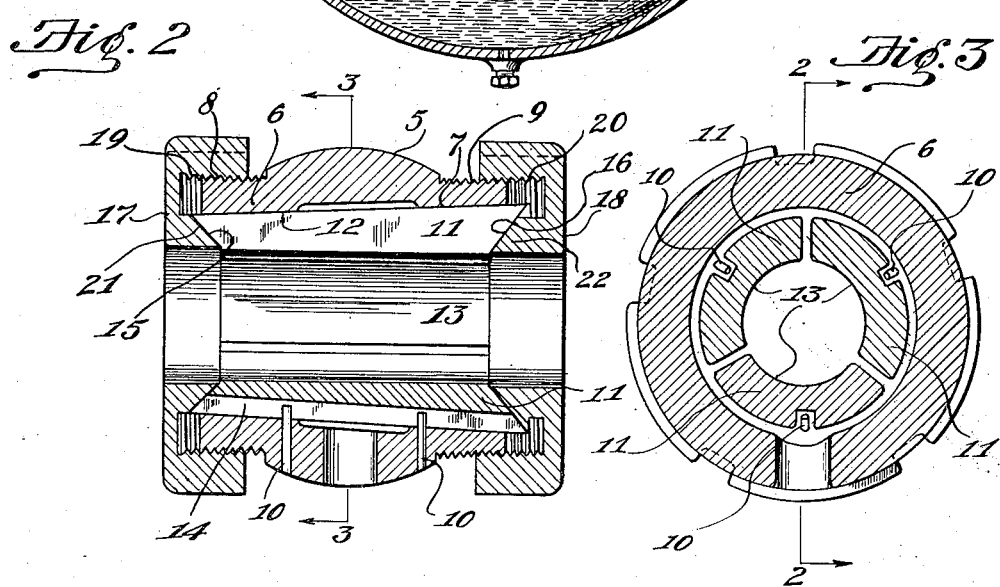
Fig. 2
Fig. 3
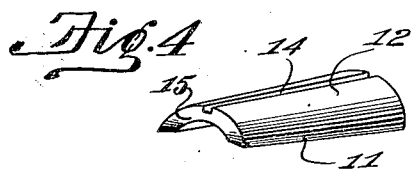
Fig. 4
INVENTOR
J. V. Sanford
BY: Freese, Merkel, Saywell & Bond
ATTORNEYS

UNITED STATES PATENT OFFICE.

JOHN V. SANFORD, OF CANTON, OHIO.

ADJUSTABLE BEARING.

1,356,561.　　　　Specification of Letters Patent.　　Patented Oct. 26, 1920.

Application filed May 29, 1920. Serial No. 385,173.

*To all whom it may concern:*

Be it known that I, JOHN V. SANFORD, a citizen of the United States, residing at Canton, in the county of Stark and State of Ohio, have invented a new and useful Adjustable Bearing, of which the following is a specification.

This invention relates to adjustable bearings for shafts or other journals and has for its objects the provision of a bearing composed of a plurality of tapered bearing members arranged to form a complete annulus around the journal and provided with means for adjusting the bearings radially to compensate for wear upon the journal and bearing and to insure a proper alinement of the journal.

The above and other objects are attained by providing the journal box with a tapered bore and forming the bearing or bushing of a plurality of segmental tapered sections, each having a longitudinal groove in its outer surface arranged to engage one or more pins extending through the inner surface of the journal box, the extremities of the wedge shaped bearing sections being internally coned and the extremities of the journal box being externally threaded to receive thimbles provided with conical projections arranged to engage the internally coned extremities of the wedge members.

With these objects in view the invention consists in the novel construction and arrangements of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a sectional view of a shaft hanger showing the application of the improved adjustable bearing to which the invention pertains.

Fig. 2 is a section on the line 2—2, Fig. 3.

Fig. 3 is a section on the line 3—3, Fig. 2; and

Fig. 4 is a detail perspective view of one of the wedge shaped bearing segments.

A practical embodiment of the invention is disclosed in the accompanying drawings, forming a part of this specification in which similar numerals of reference indicate corresponding parts throughout the several views.

Referring first to Fig. 1 of the drawings, a shaft hanger of any usual and well known construction is indicated generally by the numeral 1, the screws 2 being located through suitable bearing portions 3 in the hanger and provided with the concaved extremities 4 arranged to engage the convex portion 5 of the journal box 6.

The journal box 6 is internally coned as shown at 7 and provided at its extremities with the external threads 8 and 9. Pins 10, preferably provided in pairs and located in alinement are provided in the journal box and protrude into the interior thereof, these pairs of pins being provided at spaced intervals around the interior of the journal box as illustrated in Fig. 3.

The bearing or bushing is composed of a plurality of segmental sections 11, preferably three of said sections being provided as best shown in Fig. 3 of the drawings. Each of these sections is tapered upon its outer surface as shown at 12 and provided with an inner concaved surface 13, said sections arranged to form a complete cylindrical bearing surface when assembled.

Each of the segmental sections 11 is provided in its outer surface with a longitudinally disposed groove 14 arranged to receive one pair of the pins 10, this construction preventing any circumferential movement of the bushing or bearing within the journal box. The extremities of the segmental sections 11 are internally coned as shown at 15 and 16. Thimbles 17 and 18 provided with internal screw threads 19 and 20 are located upon the screw threaded portions 8 and 9 respectively of the journal box and are provided with the concentric conical projections 21 and 22 which engage the internally coned extremities 15 and 16 respectively of the bearing segments. The shaft 23 is journaled within the bearing thus formed. The thimbles 17 and 18 are preferably castellated as shown in order that they may be easily adjusted.

From the foregoing and the accompanying drawings it will be evident that an adjustable bearing is provided which may be easily and readily adjusted to compensate for wear in the journal or bearing, which may be easily and readily adjusted to accommodate the journal and which will at all times hold the journal in proper alinement within the bearing. It will be seen that by adjusting the thimbles to the right (see Fig. 2) the bearing segments will be moved outwardly within the tapered interior of the journal box and the bearing opening will be enlarged, while if the thimbles are adjusted to the left the bearing segments will be moved inwardly and the bearing opening reduced in diameter.

Although the drawings and above specification disclose the best mode in which I have contemplated embodying my invention I desire to be not limited to the details of such disclosure, for in the further practical application of my invention, many changes in form and construction may be made, as circumstances require or experience suggests, without departing from the spirit of the invention, within the scope of the appended claim.

I claim:

An adjustable bearing comprising a journal box provided with a tapered interior and having inwardly disposed pins, a plurality of externally tapered bearing segments mounted therein, each segment having an external, longitudinal groove arranged to receive the adjacent pins in the journal box and being internally coned at its extremities and a thimble mounted upon each threaded extremity of the journal box and provided with an inwardly disposed conical projection engaging the coned extremities of the bearing segments.

In testimony that I claim the above I have hereunto subscribed my name.

JOHN V. SANFORD.